Patented June 19, 1928.

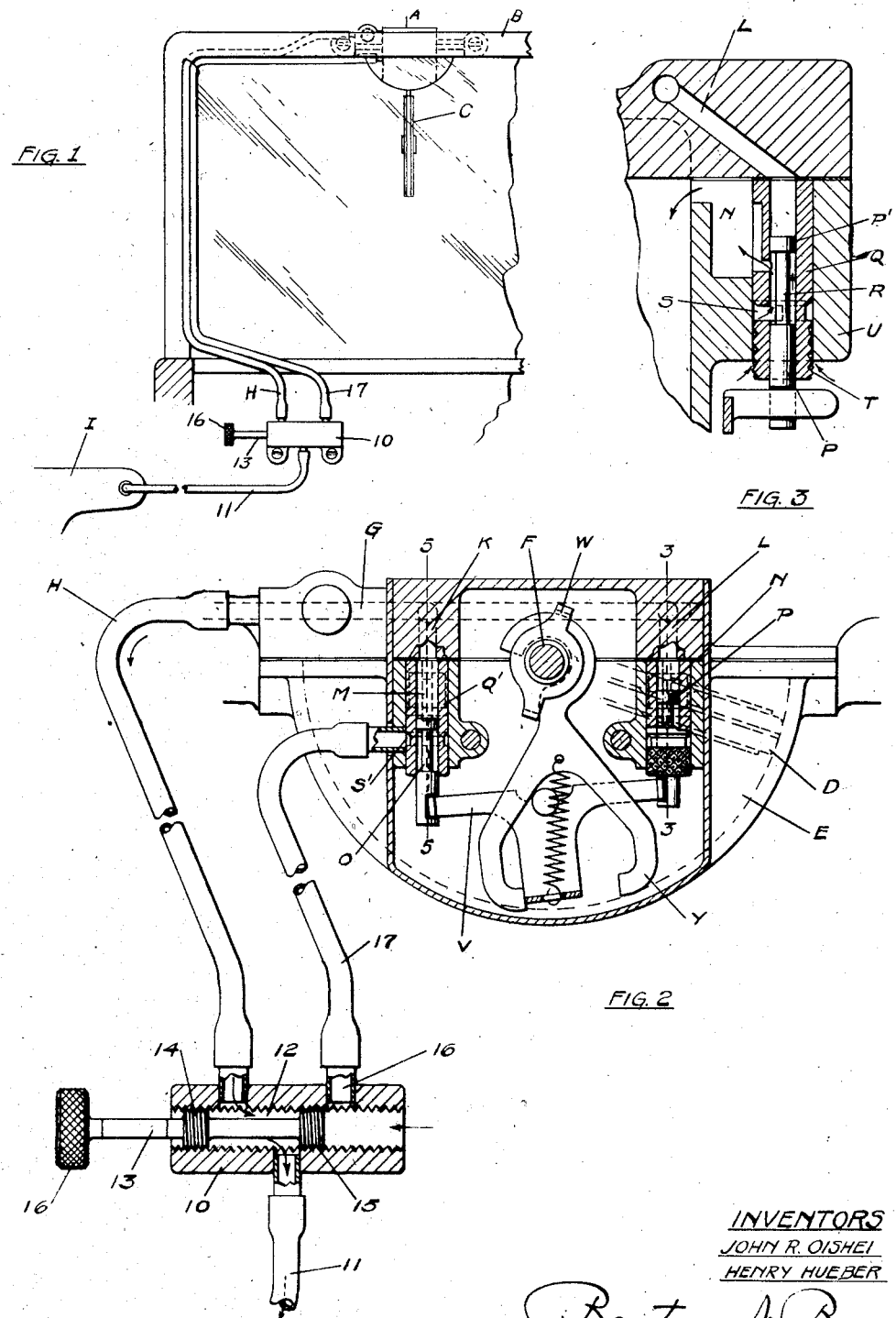

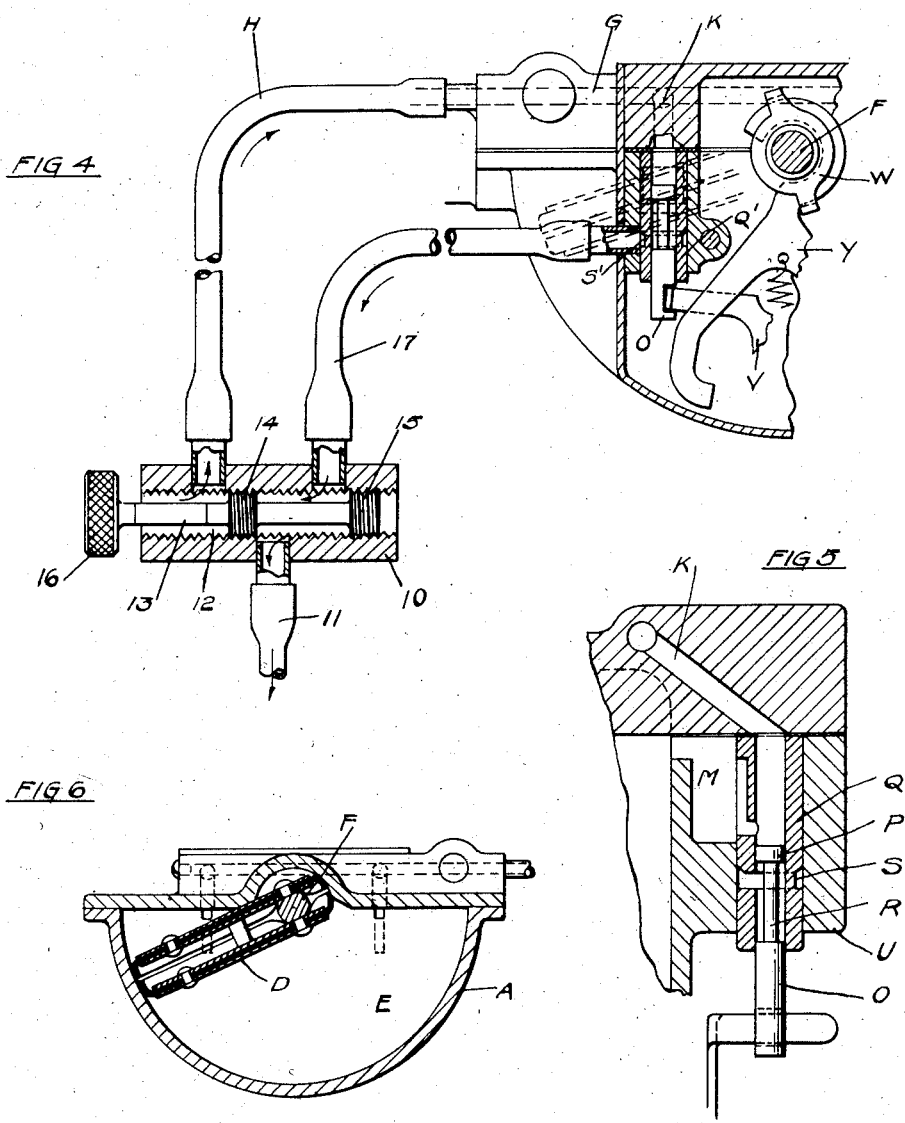

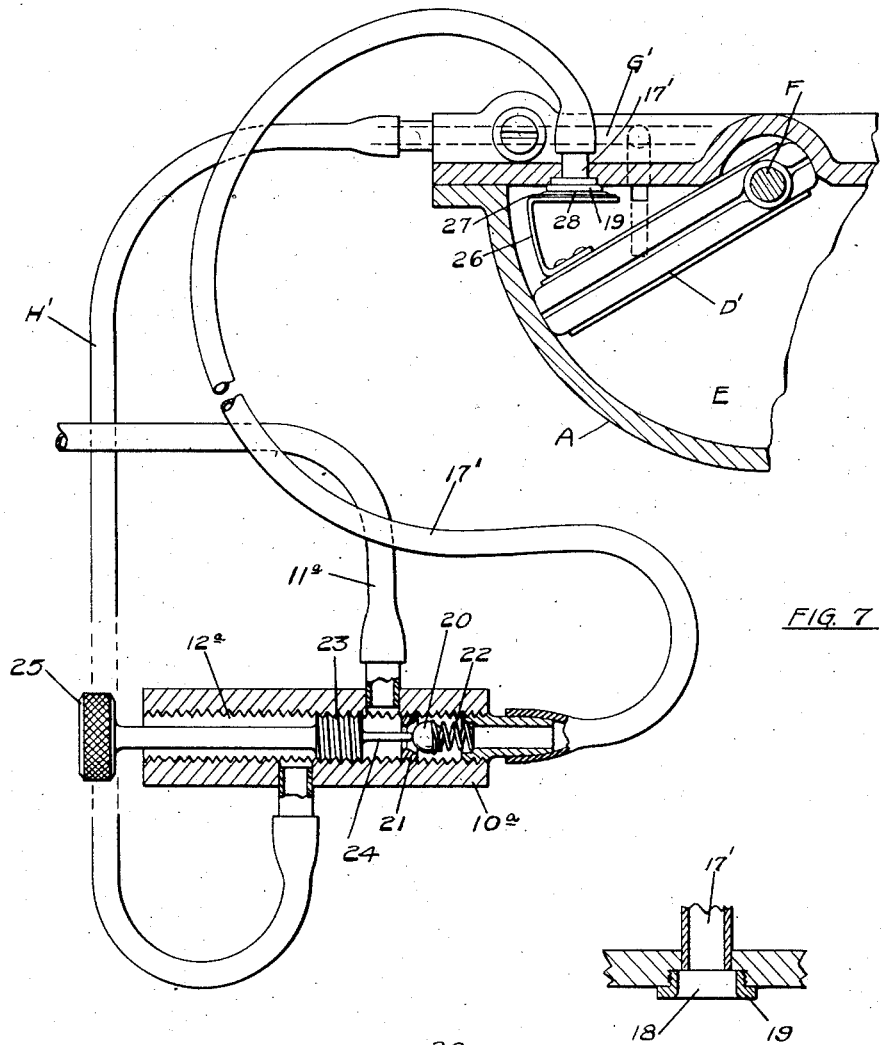
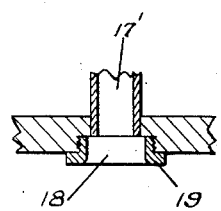
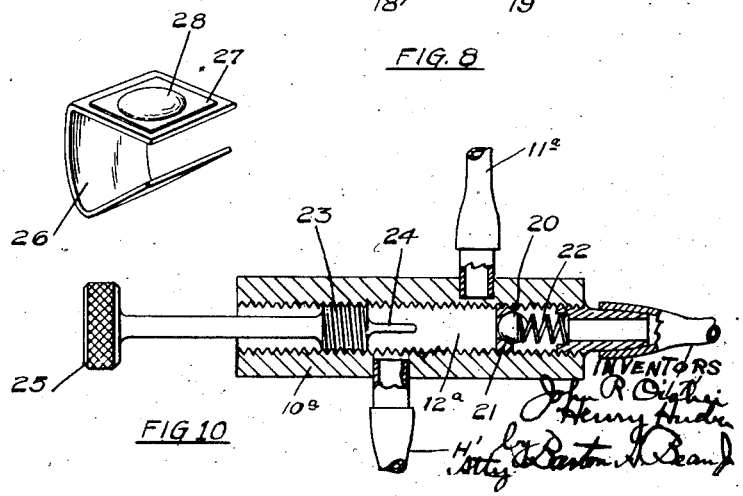

1,674,056

UNITED STATES PATENT OFFICE.

JOHN R. OISHEI AND HENRY HUEBER, OF BUFFALO, NEW YORK, ASSIGNORS, BY DIRECT AND MESNE ASSIGNMENTS, TO TRICO PRODUCTS CORPORATION, OF BUFFALO, NEW YORK.

WINDSHIELD CLEANER.

Application filed March 11, 1925. Serial No. 14,650.

This invention relates to windshield cleaners of the fluid pressure type.

In certain types of windshields now in use on motor vehicles, owing to the fact that the top front frame member or header bar to the vehicle is slotted or recessed to receive the vertical sliding glass of the windshield, it is impractical to position the motor of the windshield cleaner on the inside of the windshield glass, as the shaft of the motor extending through the header bar would interfere with sliding movements of the windshield glass. To meet this, the atmospheric air operated, or so-called suction type of windshield cleaners are mounted on the outside of the windshield and their operation controlled by means of a shut-off valve in the line from the windshield cleaner motor to the manifold or vacuum tank of the engine of the car, the shut-off valve being positioned inside of the car or vehicle. Such installations do not permit any manual adjustment by the driver of the position of the windshield wiper strip on the windshield and in case, for example, when the motor is cut off with the wiper between the limit points of its stroke, it is practically impossible to effect, by means of the shut-off valve a movement of the wiper just sufficient to place it at one of its limits of stroke where it will not interfere with vision through the windshield glass. Further, in some of the devices in use, when the device ceases operating with the wiper at one of its limits of stroke, there is a tendency on the part of the wiper strip to ride or creep on the windshield glass, resulting in the wiper taking positions in which it obstructs vision through the shield.

The objects of the present invention are to provide means whereby the wiper strip of a fluid pressure operated windshield cleaner is moved to and retained in predetermined position on the windshield glass when the cleaner is put out of operation; also to provide an improved control valve for fluid pressure operated windshield cleaners whereby the wiper may be readily moved to and automatically retained in predetermined position on the shield, an operation initiated from the inside of the vehicle or car; also to provide improvements in the other respects hereinafter set forth and claimed.

In the accompanying drawings:

Fig. 1 is an elevation of a portion of a windshield frame showing an embodiment of the invention.

Fig. 2 is a sectional elevation of an embodiment of the invention.

Fig. 3 is a section on line 3—3, Fig. 2, on an enlarged scale.

Fig. 4 is a sectional elevation of a portion of a windshield cleaner and control means embodying the invention.

Fig. 5 is a section on line 5—5, Fig. 2, on an enlarged scale.

Fig. 6 is a section through the pressure chamber of the windshield cleaner motor.

Fig. 7 is a sectional elevation of a portion of a windshield cleaner and the controlling means, embodying a modified form of the invention.

Fig. 8 is a section of a portion of the cleaner motor and the control port.

Fig. 9 is a perspective view of the control port valve.

Fig. 10 is a sectional elevation of a control valve of modified form showing the valve in normal operating position for operating the wiper.

A designates a pressure operated motor for the windshield cleaner mounted on the outside of a windshield B and operating the windshield wiper C. The motor and the wiper may be of any desired form or type, that shown in the drawings being of the vane type in which a vane D swings or oscillates in a pressure chamber E on a rock shaft F which drives the wiper. In the embodiment shown, the motor is provided with a passage G communicating by means of the tube H with the intake manifold I of the vehicle engine, or other suitable source of suction. The passage G communicates with passages K and L which in turn communicate with passages M and N leading to the pressure chamber.

Communication between passages K and M and passages L and N is controlled by means of a pair of valves O and P, which valves also control the admission of atmospheric air to the pressure chamber to relieve vacuum therein. These valves may be constructed as shown in Fig. 3 where the valve P is movable in a sleeve or bushing Q and is provided with a recessed portion R. The sleeve or bushing Q is recessed as at S and atmospheric air is admitted to this recessed portion through the space between the knurled portion T of the bushing and the sides of the member U, which holds the bushing in place. The valve is provided with a head P' which has a relatively close fit in the bushing. In the position of the valve shown in Fig. 3 communication is closed between the passage L and the passage N so that air is not being drawn out of the pressure chamber through this valve, but air is admitted to the pressure chamber, as indicated by the arrows in the figure, passing over the knurled portion T of the bushing into the space S and up along the recessed or cut away portion R of the valve and into the passage N and thence to the pressure chamber. When this valve is in the position shown in Fig. 3, the other valve, as illustrated in Fig. 2, is in a position where its head prevents the passage of atmospheric air into the pressure chamber but allows air to be withdrawn from the pressure chamber through passages G, K and M.

In the device illustrated there is always atmospheric air between the plates of the vane to hold the cup leather packings out against the walls of the chamber, this air being admitted along the shaft F through its journal bearings in the motor casing or chamber E to the interior of the vane. Now if the air is removed from one face of the vane through valve O, atmospheric air entering through valve P will press upon the reverse face of the vane and swing the vane in the direction from which the air is being removed. When the vane has reached its limit of swing, then the valves are reversed so that suction or the relatively low pressure, enters through valve P and atmospheric air, or the relatively high pressure, enters through valve O whereupon the vane swings in the other direction. The valves are reversed by means of a rocker V actuated by a cam W which oscillates with the rock shaft, rocking of the rocker being effected by means of a spring connector member Y.

10 designates a control valve adapted to control communication of the tube H with the suction or vacuum producing means and also to definitely position the wiper at a predetermined place on the windshield glass and to retain it in such position.

In the embodiment shown, 11 designates a tube connecting the control valve to the intake manifold or source of partial vacuum and the control valve embodies means for connecting the air exhausting passage of the cleaner motor with the vacuum. In the embodiment shown, the control valve 10 has a substantially central passage 12 and a valve plug 13. The valve plug 13 is provided with heads 14 and 15 and with a suitable handle portion, such for example, as 16, and when positioned as shown in Fig. 2, places the air exhaust passage G of the cleaner motor in communication with the manifold or source of vacuum. In order to position the windshield cleaner in a predetermined position on the windshield glass, the control valve communicates through a port 16' and tube 17 with the recessed portion S' of the bushing Q'. This valve is not provided with air admission spaces at the lower part of the bushing for the valve, as is the other valve illustrated in Fig. 2, so that all atmospheric air admitted through this valve must come through tube 17. In the position of the control valve shown in Fig. 2, the tube 17 and the recessed portion of the bushing are open to the atmosphere and, therefore, in the position of the control valve shown in this figure the vane of the cleaner motor will oscillate, swinging the windshield wiper on the glass.

When it is desired to arrest operation of the windshield wiper, the valve plug 13 is turned, whereupon the threaded heads 14 and 15 of the valve plug move along in the control valve passage until the heads reach the positions shown in Fig. 4. In such positions it will be noted that the tube H which was in communication with the partial vacuum is now open to the atmosphere, and, therefore, no air will be withdrawn through that tube. The tube 17 which was in communication with the atmosphere in the position shown in Fig. 2, is in communication with the partial vacuum in the positions illustrated in Fig. 4, and, therefore, the left face of the vane is subjected to the suction influence and the right face of the vane is open through the right-hand valve passage G and tube H to the atmosphere. This will hold the vane and the wiper to the extreme left limit of their strokes and will prevent the wiper creeping down on the windshield glass to a vision obstructing position. In the position of the motor reversing valve shown in Fig. 4, the vane is just ready to begin its swing to the right but instead of receiving pressure for that swing by reason of the position of the control valve shown in Fig. 4, and atmospheric air admitted to the left face of the vane, that face of the vane is under suction and the right face of the vane is in communication with the atmosphere through passage G and tube H. If the vane has advanced from the position shown in Fig. 4 and completed a portion of its swing toward the right, by reason of the position of the control valve shown in that figure, the atmospheric air which was being admitted through tube 17 to the left face of the vane is withdrawn and that face of the vane subjected to suction, the right face of the vane being subjected to atmosphere, which results in the vane retracing its movement and returning to the position shown in Fig. 4.

In the modified form shown in Figs. 7, 8, 9 and 10, the control valve 10ᵃ is connected by means of a tube 11ª to a partial vacuum or source of suction, this control valve having a passage 12ª interiorly threaded. In these figures H' designates a tube extending from the control valve to the passage G' of the cleaner motor and 17' designates a tube extending from the control valve to the cleaner motor. In this form the auxiliary tube 17' communicates with the pressure chamber by means of a port 18. As shown in Fig. 8, this port is preferably surrounded by a collar or seat portion 19. In this form, the vane D' is provided with a part for controlling the passage of fluid through port 18. The control valve 10ª is provided with a valve for controlling communication to the auxiliary tube 17'. In the form shown, this is in the form of a ball valve 20 adapted to seat on a seat 21 in the interior of the valve 10ª. In normal operating position this valve preferably closes communication to the auxiliary tube 17', being resiliently held by suitable means, as for example the spring 22 on its seat 21, as shown in Fig. 10. The control valve is provided with a head 23 and with an operating part or member 24 for moving the ball valve 20. The head 23 is preferably screw threaded so as to rotate or turn in engagement with the internal passage of the control valve and the control valve plug is preferably provided with a handle 25. In the position of the control valve shown in Fig. 10, the ball valve 20 is on its seat, thereby closing communication to the tube 17' and communication is open from the tube 11ª to the source of suction and the tube H'. In this position of the valve the wiper motor is in operation, the vane of the motor oscillating and swinging the wiper.

When it is desired to arrest operation of the cleaner the handle 25 of the valve is turned, whereupon the head 23 of the control valve plug is moved inwardly of the control valve to the position shown in Fig. 7 wherein the tube H' is open to the atmosphere. As the control valve plug moves inwardly the member 24 shoves the ball valve 20 off of its seat, thereby opening communication between tube 11ª and the tube 17'. This places the left face of the vane under the suction influence through port 18 and the right face of the vane is placed in communication with the atmosphere through tube H' and passage G', as explained in detail hereinbefore on the other form of device. The vane will thereupon swing to the left until it reaches the limit of its stroke and, therefore, the wiper will be positioned and held at its left limit of stroke until the cleaner is again put in operation. In order to prevent any constant pressure or suction influence on the vane, the vane may be provided with a member or part for controlling the port 18. In the form shown there is provided a valve part 26 secured by suitable means to the vane and having a port closing portion 27. This port closing portion may be provided with a flexible portion 28 of leather or suitable material adapted to contact with the collar 19 of the port 18. It will be seen that when the parts are in the position shown in Fig. 7, the tube 17' and port 18 are under the suction or vacuum influence and the flexible member 28 is seated on the collar 19 and held firmly there in place by the air pressure on its face in the pressure chamber. If, by reason of vibration or for any other reason, the vane should tend to creep or fall from the position shown in Fig. 7, this would uncover port 18, whereupon the vacuum influence would be exerted upon the left face of the vane D' and the vane would be quickly returned to the position shown in Fig. 7.

In the form of the invention disclosed in Figures 1 through 5, the valve O should preferably be in such position as to connect the atmosphere to the left hand side of the piston or vane when the parking suction is applied, because in this position of the valve the passage S' is in communication with the port M. Such a position for the valve O may be readily obtained by the operator since the valve parts 14 and 15 gradually close off the operating suction before opening to the parking suction, and this gradual closing may be readily controlled to occur when the piston is moved in a counterclockwise direction relative to Figure 4.

In the form of the invention disclosed in Figures 7, 8 and 9 the parking of the wiper may be readily effected regardless of the direction of movement of the piston or vane D', since the parking suction exhausts the air from the left side of the piston more rapidly than atmosphere can enter through the relatively smaller casing port which communicates with the pipe H'. In practice it has been found that this exhaustion by the parking suction effects a definite movement of the piston in a clockwise direction until the leather valve 28 seats over the parking port.

We claim as our invention:

1. In a windshield wiper, a wiper member adapted to contact with the windshield to be cleaned, a motor casing, a fluid pressure actuated piston in said casing, operating connections between said piston and said wiper member, a conduit connecting said casing on opposite sides of the piston to a source of suction, valve means in said conduit to alternately connect the casing on opposite sides of the piston to the source of suction for automatically exhausting the air in said casing alternately from the faces of said piston for operating the wiper, and a valved conduit connected to the casing to one side of the piston for continuously exhausting air from said casing at one face of said piston.

2. In a windshield wiper, a wiper member adapted to contact with the windshield glass to be cleaned, a motor casing, an oscillating fluid pressure actuated member in said casing, operating connections between said actuated member and said wiper, a control valve in communication with a source of suction, an air exhaust line from said casing to said control valve, means for alternately placing the exhaust line in communication with the opposite sides of said actuated member, and a conduit from said control valve to said casing, said valve including means for severing communication between said air exhaust line and the source of suction and for placing the conduit in communication with the source of suction thereby applying the air exhausting influence continuously to one side of said actuated member to shift said wiper member to and retain it at a predetermined point on the windshield glass.

3. In a windshield wiper, a wiper member adapted to contact with the windshield to be cleaned, a fluid pressure chamber, a fluid pressure operating member in said chamber operably connected to said wiper member, conduits and valve mechanism for applying fluid pressure intermittently to the working faces of said operating member to operate said cleaner, the wiper-parking conduit connected to the chamber for applying fluid pressure continuously to one of the faces of said member to arrest operation of said cleaner.

4. In a windshield cleaner, a wiper member adapted to contact with the windshield to be cleaned, a motor casing, a fluid pressure actuated piston in said casing operably connected to said wiper member, means for applying fluid pressure alternately to opposite faces of said piston to move said cleaner on the windshield glass, and means for maintaining said wiper member in a predetermined position on the windshield glass, including a suction port in the casing at one side of the piston and a part on said piston adapted to cover the suction port in the casing for continuously receiving fluid pressure independently of the pressure alternately applied to the faces of said piston.

5. In a windshield cleaner, a wiper member adapted to contact with the windshield to be cleaned, a fluid pressure chamber, a fluid pressure operating member in said chamber operably connected to said wiper member, said chamber having a pair of combined air inlet and air outlet ports, one of said ports communicating with one working face of said operating member and the other of said ports communicating with the other working face of said member, means for automatically controlling said ports to alternately apply fluid pressure to the faces of said operating member to move said cleaner member on the windshield, said chamber having an air outlet port spaced from said combined inlet and outlet ports, a conduit connected to said combined air inlet and outlet ports, a second conduit connected to said spaced air outlet port, a valve casing to which said conduits connect at spaced points, a suction port in said valve casing, and valve means in the valve casing for selectively connecting the suction port to said conduits for effecting either alternate withdrawal of air from said combined inlet and outlet ports to operate said wiper or for continuously subjecting said operating member to an air withdrawing influence through said outlet port to secure said wiper in a predetermined position on the windshield glass.

6. In a windshield cleaner, a wiper member adapted to contact with the windshield to be cleaned, a fluid pressure chamber, a fluid pressure operating member in said chamber operably connected to said wiper member, said chamber having a pair of combined air inlet and air outlet ports, one of said ports communicating with one working face of said operating member and the other of said ports communicating with the other working face of said member, means for automatically controlling said ports to alternately apply fluid pressure to the faces of said operating member to move said cleaner member on the windshield, said chamber having an air outlet port spaced from said combined inlet and outlet ports, a flexible part on said operating member movable over said air outlet port to retain said wiper in predetermined position on the windshield glass when said outlet port is placed in communication with an air withdrawing influence.

7. In a windshield cleaner, a wiper member adapted to be moved in contact with the windshield glass to clean the same, a fluid pressure motor for moving said wiper member intermittently in opposite directions on the windshield glass and valve means connected for directing the fluid into the motor to hold the same inoperative and thereby maintain the wiper member in predetermined position on the windshield glass.

8. A windshield cleaner comprising a casing member, a piston operable therein, automatic valve mechanism for operatively applying fluid pressure to the opposite sides of the piston, a parking port opening through the casing at one side of the piston through which suction may be continuously applied for drawing the piston in the direction of said parking port, a wiper operable by the piston, a flexible sealing member adapted to engage over the parking port and close the same to the interior of the casing, and means for supporting the flexible sealing member on one face of the piston but spaced therefrom.

9. In a windshield cleaner, a wiper, a casing, a piston in the casing connected to the wiper for operating the same, valve mechanism for placing the casing alternately on opposite sides of the piston in communication with a source of operating pressure for operating the wiper, a conduit connecting one side of the casing to the source of operating pressure, and a manual control for disconnecting the flow of pressure to said valve mechanism and for connecting the conduit to the source of operating pressure for parking the wiper.

10. A self-parking windshield cleaner comprising, a wiper, a fluid pressure motor for operating the same, means for directing fluid pressure into the motor for fluid-locking the wiper in a parked position, and a control remote from the motor for operatively connecting a source of suction selectively to said motor and to said means for respectively controlling the operation of the wiper and the parking thereof.

11. In a windshield cleaner, a wiper, a fluid pressure motor for operating the same and including a casing having a piston operable in the casing, means for operatively applying pressure to the piston, said casing having an auxiliary suction port and said piston having a part adapted to cover the auxiliary port and be held thereto when suction is applied to the port, and valved means for connecting the casing port to a source of suction to arrest the piston.

12. In a windshield cleaner, a wiper, a fluid pressure motor for operating the same having an oscillating piston, a conduit adapted to be connected to a source of pressure, a valve in the conduit having two ports adapted to be selectively placed in communication with the motor, and valve mechanism communicating with one valve port for admitting pressure impulses on the piston for oscillating the same, the other valve port communicating with the casing and being adapted to admit a continuous pressure to the piston for fluid-locking it.

13. A self-parking windshield cleaner comprising, a wiper, a casing, a piston reciprocable in the casing for operating the wiper, said casing having a combined air inlet and air outlet port on each side of the piston, valve mechanism for changing each port from an air outlet port to an air inlet port when the piston reaches its adjacent limit of travel, said casing having a third port adjacent one of said combined ports and beyond the path of travel of said piston, a valve casing connected to a source of pressure and having one port connected to said combined ports and adapted to be connected to the atmosphere, and a second port normally disconnected from and adapted to be connected to the third casing port, and a valve adjustable in the valve casing to connect the second valve casing port to the source of pressure and simultaneously to connect the first valve casing port to the atmosphere.

14. In a windshield cleaner, a wiper, a casing, a piston reciprocable in the casing for operating the wiper, means for alternately connecting the opposite ends of the casing first to a source of suction and then to the atmosphere for reciprocating the piston, means for rendering the first means inoperative and directly connecting one end of the casing through a port therein to the source of suction, and a port closing valve raised from the piston and carried thereby to seat on and close the casing port and be held thereon by the differential pressures for holding the piston against movement and the wiper parked, said port-closing valve removing the direct action of the suction from the piston.

15. In combination with a windshield, a windshield cleaner motor mounted on the exterior side thereof, a source of power for the motor, a wiper element operable on the exterior surface of the glass by the motor, a control connected to the motor for starting and stopping and controlling the operation of the wiper element, and a parking control for connecting the source of power to one side only of the motor to effect a parking of the wiper element out of the line of vision or to one side thereof through the windshield, both controls being arranged at the interior side of the windshield to be readily accessible from the interior of the vehicle to which the windshield is attached.

16. In a windshield cleaner, a wiper, a casing, a piston operable in the casing to actuate the wiper, a suction passage, valve mechanism mounted in the casing to alternately connect said passage with the casing on opposite sides of the piston, a control valve mounted in the suction passage, and a normally closed parking conduit adapted to be opened by the closing of the control valve for connecting the casing on one side of said piston to the suction passage.

17. In a windshield cleaner, a wiper, a casing, a piston operable in the casing to actuate the wiper, a suction conduit, automatic valve mechanism to alternately place the conduit in communication with the casing on opposite sides of the piston, said conduit having a by-pass connected to the casing on one side of the piston, a control valve for the conduit, and a second valve for the by-pass normally closing the by-pass when the first valve is open, said second valve being moved to an open position by and during closing movement of the first valve, whereby the suction in the suction conduit will be continuously applied to the casing at one side only of the piston.

18. In combination with a windshield, a windshield cleaner motor mounted on the exterior side thereof, a wiper element operable on the exterior surface of the glass by the motor, a combined operating and positive-parking control connected to the motor and operating to connect the motor to its source of power selectively for rendering the wiper operative or for parking the wiper, said combined operating and positive-parking control being arranged at the interior side of the windshield.

19. In a windshield cleaner, a casing member, a piston member, one being movable relatively to the other, a wiper operable by the movable one of said members, automatic valve mechanism for placing the casing member alternately on opposite sides of the piston member in communication with a source of suction, and wiper parking means for interrupting the communication between the source of suction and the valve mechanism and for establishing communication between the source of suction and the casing member at one side only of the piston for continuously applying fluid pressure to said casing member for holding the wiper in a parked position.

20. In a windshield cleaner motor, a casing, an actuating member mounted in said casing, said casing being provided with a suction passage, automatic valve mechanism to place said suction passage in communication with the interior of said casing on opposite sides of said actuating member, and a control valve to control the passage of fluid through said suction passage, said control valve being provided with means for connecting said suction passage to said casing on one side of said actuating member when the valve is in closed position.

21. In a windshield cleaner motor, a casing, an actuating member mounted in said casing, said casing being provided with a suction passage, valve mechanism mounted in said casing to alternately connect said casing on opposite sides of said actuating member to said suction passage, a control valve mounted in said suction passage, and means actuated by the closing of said valve for connecting said casing on one side of said actuating member to said suction passage.

22. In a windshield cleaner motor, a casing, an actuating member mounted in said casing, means for connecting said casing to a source of suction, valve mechanism mounted in said casing to alternately connect said casing on opposite sides of said actuating member to said suction means, a manually operated control valve, and means actuated by the closing of said valve for connecting said casing on one side of said actuating member to said source of suction.

23. In a windshield cleaner motor, a casing, an actuating member mounted in said casing, said casing being provided with a suction passage, automatic valve mechanism to place said suction passage in communication with the interior of said casing on the opposite sides of said actuating member, said suction passage being provided with a by-pass connected to said casing on one side of said actuating member, and a control valve to control the passage of fluid through said suction passage, said by-pass being opened by the closing of said valve.

24. In a windshield cleaner motor, a casing, an actuating member mounted in said casing, said casing being provided with a suction inlet opening, automatic valve mechanism to alternately connect said casing on opposite sides of said actuating member to said suction inlet opening, said casing being further provided with a suction passage communicating with said suction inlet opening and adapted to be connected to a source of suction, and with a by-pass connecting said suction passage to said casing on one side of said actuating member, and a manually operated valve adapted to be arranged in either of two positions whereby said by-pass will be opened when said suction passage is disconnected from said suction inlet opening.

25. In a windshield cleaner motor, a casing, an actuating member mounted in said casing, said casing being provided with a suction inlet opening, automatic valve mechanism to alternately connect said casing on opposite sides of said actuating member to said suction inlet opening, said casing being further provided with a suction passage communicating with said suction inlet opening and adapted to be connected to a source of suction, and with a by-pass connecting said suction passage to said casing on one side of said actuating member, and a manually operated valve member having valve portions adapted to be arranged in said suction passage and said by-pass whereby said by-pass will be opened when said suction passage is disconnected from said suction inlet opening.

HENRY HUEBER.
JOHN R. OISHEI.

CERTIFICATE OF CORRECTION.

Patent No. 1,674,056.                                                Granted June 19, 1928, to

JOHN R. OISHEI ET AL.

It is hereby certified that error appears in the printed specification of the above numbered patent requiring correction as follows: Page 4, line 34, claim 3, after the word "cleaner" insert ", and selectively operable means for connecting either the operating conduits or the parking conduit to a source of operating pressure"; and that the said Letters Patent should be read with this correction therein that the same may conform to the record of the case in the Patent Office.

Signed and sealed this 31st day of July, A. D. 1928.

(Seal)                                                              M. J. Moore,
Acting Commissioner of Patents.